No. 889,993. PATENTED JUNE 9, 1908.
J. A. VAUGHAN & W. M. EPTON.
MACHINE FOR TESTING ROPES.
APPLICATION FILED AUG. 27, 1907.
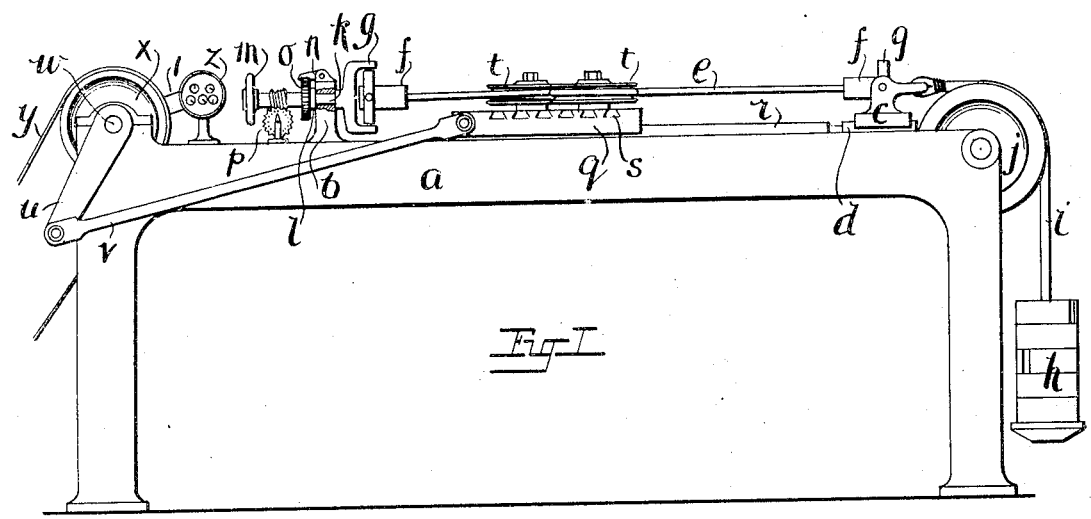
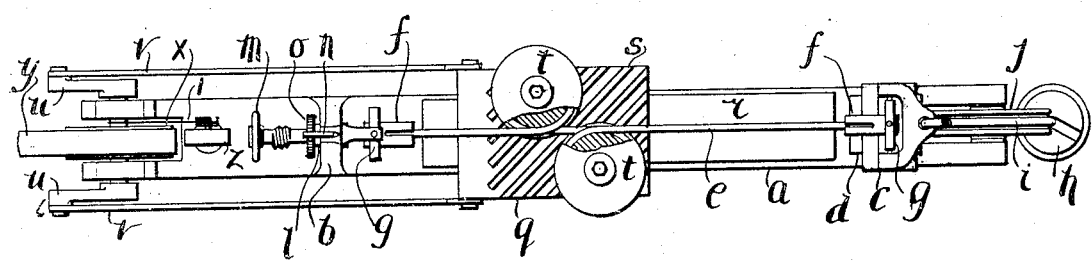
Attest:
Benton M. Stahl.
Edward N. Sartou
Inventors.
John Alfred Vaughan.
William Martin Epton.
by Spear, Middleton, Donaldson & Spear,
Attys.

UNITED STATES PATENT OFFICE.

JOHN ALFRED VAUGHAN AND WILLIAM MARTIN EPTON, OF JOHANNESBURG, TRANSVAAL, ASSIGNORS TO GEORGE CRADOCK, OF BOLTON LODGE, BOLTON PERCY, YORKSHIRE, ENGLAND.

MACHINE FOR TESTING ROPES.

No. 889,993.  Specification of Letters Patent.  Patented June 9, 1908.

Application filed August 27, 1907. Serial No. 390,396.

*To all whom it may concern:*

Be it known that we, JOHN ALFRED VAUGHAN and WILLIAM MARTIN EPTON, British subjects, residing at Winchester House, Loveday street, Johannesburg, in the Colony of the Transvaal, have invented certain new and useful Improvements in Machines for Testing Ropes for Winding, Hauling, and Like Purposes or the Strands or Wires Therefor, of which the following is a specification.

The present invention relates to the testing of ropes intended for winding hauling or like purposes or the separate strands or wires of or for the same; the object being to provide an apparatus for this purpose, such that the conditions of the tests and the stresses produced in the specimen during testing approximate closely in character and effect to those occurring under ordinary working conditions in mine and similar work, although differing in degree.

Apparatus according to this invention is constructed to subject the specimen simultaneously to tension; to intermittent flexure through any desired angle and restraightening with or without reversed bending applied successively over a substantial portion of its length; to friction upon pulleys and also if desired upon itself; and in some cases also to torsion.

In the accompanying drawings, Figure I is a side elevation and Fig. II a plan of one embodiment of the invention constructively suitable for testing single wires or strands.

Therein $a$ indicates a main framework, $b$ a fixed headstock and $c$ a tailstock freely movable longitudinally of the table upon a guide $d$.

The specimen $e$ is held in grips $f$ of any convenient construction, which grips are secured to the stocks by universal joints such as the gimbals $g$ illustrated. The purpose of these connections is to obviate bending of the specimen at the mouth of the grips.

Tension is applied to the specimen by means of the adjustable weight $h$ connected to the tailstock $c$ by a flexible connection $i$ which passes around an idler pulley $j$, but it will of course be understood that the means for applying and indicating the tension would be largely modified according to the size of the specimen which the machine is designed to test.

To enable the specimen to be twisted, the head gimbal has a journaled shaft $k$ which passes revolubly through the headstock $b$ and is secured therein by a collar $l$. To the shaft is keyed a hand wheel $m$ for rotating it and a detent $n$ and detent wheel $o$ are provided to hold the shaft in the desired position. An indicator $p$ shows the angle through which the specimen has been twisted.

$q$ is a table mounted upon a suitably constructed guide $r$ to slide freely in a longitudinal direction upon the frame $a$. The upper surface of the table has a number of undercut grooves $s$ by which one or more grooved pulleys $t$ may be secured to the table at any desired point to revolve freely thereon. About such pulley or pulleys $t$ the specimen is lapped in such manner as may appear desirable for any individual test. In the illustration two pulleys are shown and the specimen is lapped completely about each one in succession, but of course any other arrangement may be made.

The table is caused to reciprocate upon the guide $r$ by cranks $u$ and connecting rods $v$, the cranks being keyed to a shaft $w$ on which is a pulley $x$ driven by belt $y$. A counter $z$ is driven off the crank shaft $w$ by a band $l$, and indicates the number of reciprocations of the table in a given time.

While the nature of the tests may obviously be varied to a very large extent according to the results desired, a typical procedure in comparing the working values of two specimens obtained from different sources would be as follows. The pulley or pulleys $t$ of the requisite size having been secured to the table $q$ in such position as may be desired, a specimen of the desired length is fixed at one end in one of the grips passed about the pulley or pulleys $t$ to the extent and in the manner predetermined and thereupon fixed into the remaining grip. A measured tensional stress is then applied by means of the adjustable weight $h$ and if desired torsional stress is produced and noted. Reciprocation of the table is now started and continued until the specimen fractures. In the event of the specimen becoming unduly heated, suitable steps would be taken to remove the heat and maintain the temperature at the normal level. The second specimen being then treated in an exactly similar manner, the number of reciprocations of the table in each case will furnish a measure of the relative efficiencies under the actual working conditions simulated in the form of the test.

Many other methods of using the machine will suggest themselves, as for example the determination of the efficiency of identical samples under diverse working conditions.

We claim as our invention:—

1. In a testing machine of the class specified, the combination of means for subjecting the specimen to measurable and regulatable tension, a plurality of loose pulleys about which the specimen is lapped, means for holding said pulleys with their axes in fixed relation to one another, and means independent of the tensioning means for reciprocating said pulley holding means.

2. In a testing machine of the class specified, the combination of means for subjecting the specimen to measurable and regulatable tension, pulleys about which the specimen is lapped, means for reciprocating said pulleys, means for holding the specimen and for applying torsion thereto.

3. In a testing machine of the class described, the combination of a bed, a table slidably mounted thereon, means for reciprocating the table, a counter for recording the reciprocations, loose pulleys adapted to be secured to the table about which pulleys the specimen is lapped, flexibly mounted grips for the specimen and means for applying tension to the specimen through the grips.

4. In a testing machine of the class described, the combination of a bed, a table slidably mounted thereon, means for reciprocating the table, a counter for recording the reciprocations, loose pulleys adapted to be secured to the table about which pulleys the specimen is lapped, flexibly mounted grips for the specimen, means for applying tension to the specimen through the grips, one of said grips being capable of rotation to twist the specimen and means for locking such rotatable grip.

5. In a testing machine of the class described, the combination of a bed, a table slidably mounted thereon, means for reciprocating the table, a counter for recording the reciprocations, loose pulleys adapted to be secured to the table, about which pulleys the specimen is lapped, flexibly mounted grips for the specimen, means for applying tension to the specimen through the grips, one of said grips being capable of rotation to twist the specimen, means for locking such rotatable grip and an indicator for measuring the twist imparted to the specimen.

In testimony whereof we affix our signatures in presence of two witnesses.

JOHN ALFRED VAUGHAN.
WILLIAM MARTIN EPTON.

Witnesses:
ALFRED L. SPOOR,
C. H. M. HIRCH.